No. 694,983. Patented Mar. 11, 1902.
J. H. NIEMAN.
CLOTH OR PAPER MEASURING MACHINE.
(Application filed May 17, 1900.)
(No Model.)
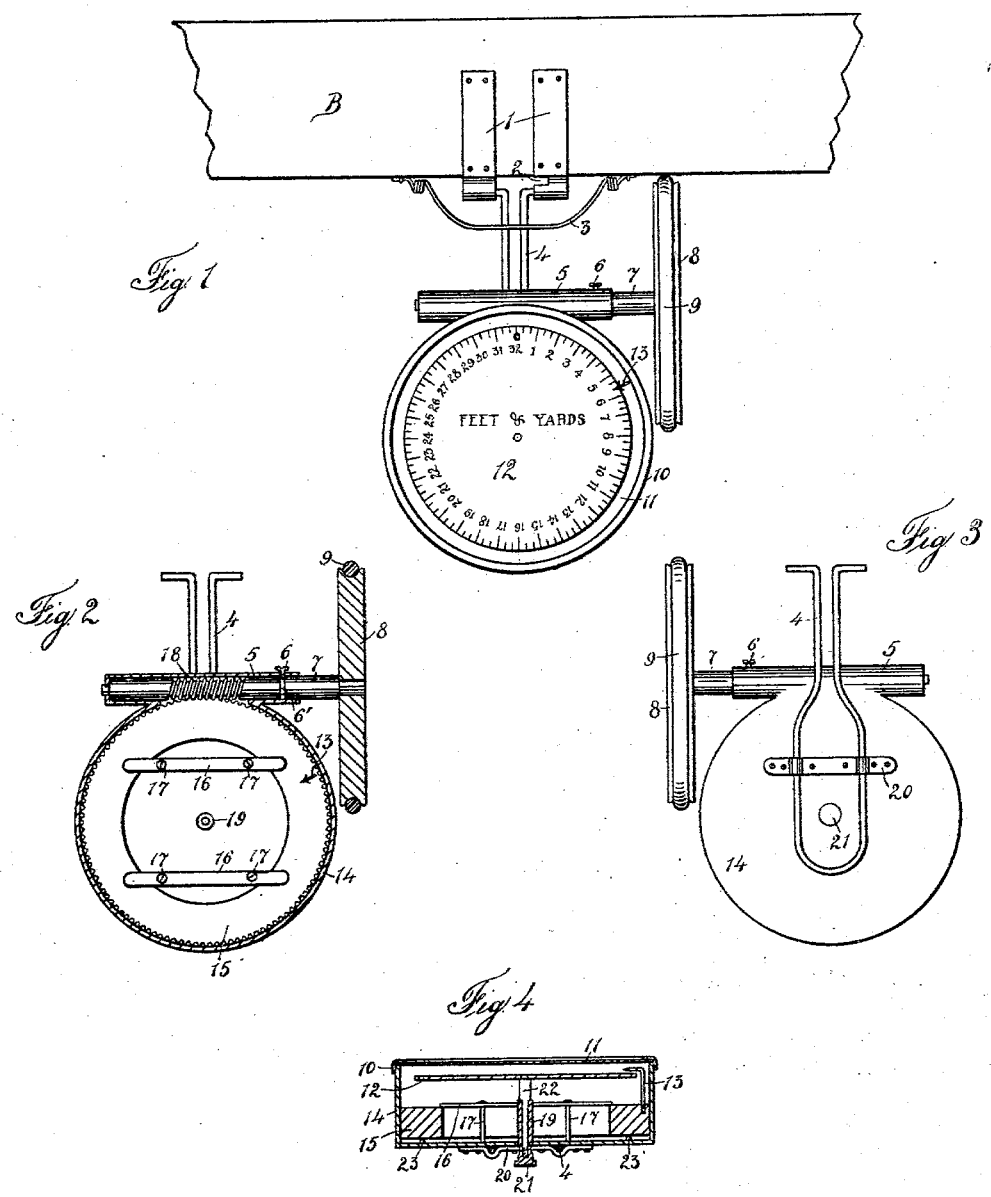
Witnesses:
C. F. Patterson
R. J. Davenport
Inventor
John H. Nieman
per Geo. W. Sues
Attorney

UNITED STATES PATENT OFFICE.

JOHN HENRY NIEMAN, OF PETERSBURG, NEBRASKA.

CLOTH OR PAPER MEASURING MACHINE.

SPECIFICATION forming part of Letters Patent No. 694,983, dated March 11, 1902.

Application filed May 17, 1900. Serial No. 17,075. (No model.)

*To all whom it may concern:*

Be it known that I, JOHN HENRY NIEMAN, a citizen of the United States, residing at Petersburg, in the county of Boone and State of Nebraska, have invented a new and useful Cloth or Wall-Paper-Border Meter, of which the following is a specification.

This invention has relation to a simple meter adapted to be used to measure cloth, wall-paper, and other materials usually sold in bulk, the aim being to provide a simple device that can be readily attached or detached to a support positioned adjacent to or above the material to be measured.

The invention is further particularly adapted to the uses of paper-hangers in that the same may be attached to a wall-paper trimmer to indicate the amount of paper trimmed.

In the accompanying drawings I have shown in Figure 1 a top view of my cloth and wall-paper meter, showing a portion of the supporting-strip as broken away. Fig. 2 shows a view, partly in section, disclosing the arrangement of my meter. Fig. 3 shows a bottom view thereof, while Fig. 4 shows a central sectional view of the meter proper.

My invention embodies, essentially, a housing comprising the casing marked 14, which is preferably circular and to which is secured an ordinary glass top comprising the frame 10, holding the glass 11. Secured to the housing 14, which has an opening at one point within the side, is a sleeve 5, within which sleeve is revolubly held a worm-shaft 7, provided with the groove 6', into which works a screw 6, so as to hold the worm-shaft in position. Secured to this worm-shaft is a wheel 8, provided with a rubber tire, which wheel is adapted to ride upon the material to be measured, and as the material is drawn through below the wheel this wheel is revolved to indicate the amount of material passing below the same. Positioned within the housing 14 and within the bottom thereof are a plurality of little upwardly-extending pins 23 23, upon which works an annulus or ring which has its outer peripheral surface cut to form a pinion adapted to work and mesh in connection with the worm 18, as is shown in Fig. 2. This ring works loosely upon these pins and is revolved in one plane, while the worm-shaft 18 revolves in a plane at right angles thereto, as will be understood in referring to the drawings. In order to prevent this loosely-held annulus or hollow worm-gear 15 from moving upward, I provide two bars 16 16, held by means of pins 17, so that this worm-pinion is revolubly held upon the pins 23 and between the bars 16.

Secured to the worm-pinion 15 is an upwardly-extending indicator 13, which projects above a dial 12, as is shown in Fig. 1, which dial is stationary, being provided with a pin 22, fitting into a collar 19. This pin 22 below is threaded to receive the cap 21, so that the dial 12 is properly held in position. By means of this cap the dial may be set to zero at any point. In starting the indicator the zero of the scale would be brought below the indicator 13 and the quantity of material passing below the wheel would be registered. Then when a new quantity was to be measured by means of the cap 21 the dial 12 would be revolved until this zero-mark came below the indicator 13, so that while this dial is stationary it is adjustably supported within the housing. In the drawings the zero and "32" marks are the same, because one begins and the other ends upon that line.

Below the housing 14 is provided with a holder 20, through which slidably works an arm 4, which arm is movably secured to the ears 1, fastened to a suitable support B. In order to insure the wheel 8 working down and pressing upon the goods passing below the bar B, I use an ordinary coil-spring 3, so that this measuring apparatus is normally in a downwardly-pressed condition.

Now in order to operate this device it is simply necessary to draw the material to be measured through below the wheel 8.

It is of course understood that the support B could be secured to a weight or fastening in any convenient way so that one edge of the material to be measured could be brought below the wheel 8 to revolve the same and record the amount of goods passing through below the same.

Having thus described my said invention, what I claim as new, and desire to secure by United States Letters Patent, is—

The combination with a circular housing 14 provided with a glass top, said housing being provided with an opening upon its side, of the sleeve 5 secured to said housing at the point of perforation, of the worm-shaft 7 revolubly held within said sleeve 5, said worm-shaft being provided with the groove 6' the set-screw 6 working through said sleeve 5 into said groove 6', of the wheel 8 secured to said shaft 7, of the elastic tire 9 secured to said wheel 8, the upwardly-extending pins 23, 23 positioned within the bottom of said housing 14 and an annulus or ring 15 having its peripheral surface cut to mesh with said worm-shaft 7 said ring working loosely upon said pins 23, 23 the bars 16, 16 to prevent said ring from working upward, the pins 17, 17 to hold said bars 16, the upwardly-extending indicator 13 secured to said ring 15, the dial 12, said indicator 13 extending above said dial, the pin 22 supporting said dial 12, the collar 19 supporting said pin 22 said pin 22 below being threaded, and the threaded cap 21 adapted to screw upon said collar 19 so that said dial may be set to zero to point substantially as illustrated and described.

In testimony wherefore I have signed my name to this specification in the presence of two subscribing witnesses.

JOHN HENRY NIEMAN.

Witnesses:
WM. DAVID ABEL,
C. W. DIMICK.